United States Patent Office

3,618,497
Patented Nov. 9, 1971

3,618,497
APERTURE SETTING DEVICE FOR USE IN COMPOUND PHOTOGRAPHIC CAMERA
Hisanori Ataka, Kawasaki-shi, Japan, assignor to Kabushiki Kaisha Ricoh, Tokyo, Japan
Filed May 14, 1969, Ser. No. 824,511
Claims priority, application Japan, May 16, 1968, 43/33,070
Int. Cl. G03b 19/02, 27/42
U.S. Cl. 95—36 R                                    2 Claims

ABSTRACT OF THE DISCLOSURE

An aperture setting device for a compound photographic camera wherein each of a first and second movable plates, arranged so as to move at right angles relative to each other, has an elongated slot formed at a right angle relative to the movements. The intersection of these elongated slots forms an aperture; and when the first movable plate is displaced to its end of movement, it actuates the pawl for the second movable plate so as to advance it by one step or row while the first movable plate, which has been prevented from the reverse motion, is returned to its initial position. The aperture formed by the slots corresponds to one of apertures formed immediately behind the objective lens. Each of the movable plates is returned to its initial position by actuating elements from the exterior of the camera so as to release a member in engagement with the plate.

BACKGROUND OF THE INVENTION

The present invention relates to an aperture setting device for use in a compound photographic camera and more particularly to a device for selecting an aperture for photography among the aperture group formed immediately behind an objective lens of a compound photographic camera.

In case of photography by a compound photographic camera one of the apertures must be selected for photography among the aperture group; that is, the position of the aperture must be set. For this purpose there have been proposed many devices, which are preferably compact in size, simple in construction or mechanism, and reliable and accurate in operation. Furthermore, it is required that upon completion of one photograph, the state or condition for the next photograph is set automatically and the aperture setting device is also automatically returned to its initial position after completion of all photographing operations.

The primary object of the present invention is to provide a device of the type described which can meet the above requirements in a more satisfactory manner than the conventional devices.

SUMMARY OF THE INVENTION

The present invention relates to an aperture setting device for use in a compound photographic camera of the type in which an image formed by an objective lens is further split and focused through a plurality of micro-lenses arranged upon a plane, thereby recording these split images upon predetermined areas of one light-sensitized layer; another image of another subject formed through the objective lens is further split and focused through the plurality of micro-lenses, thereby recording these split images upon other predetermined areas of the same sensitized layer so as not to superpose upon the first images and so on (whereby a plurality of pictures can be recorded upon the single sensitized layer as split and distributed images which cannot be perceived if only looked at by the naked eye).

According to one aspect of the present invention, the setting of the aperture is made by two movable plates each having an elongated slot formed at a right angle relative to the movement of the movable plate, the two movable plates being displaced at right angles relative to each other. Consequently, the elongated slots intersect with each other at right angles, thereby forming one opening or aperture. When the movable plates are displaced by one step at one time, the position of the aperture is displaced accordingly, so that the apertures may be set to positions the number of which is determined by the product of the number of steps in displacement of one movable plate by that of the other movable plate. In this case, the aperture formed by the intersection of the elongated slots as described above corresponds with one aperture of the aperture group formed in the proximity of the objective lens.

It is now obvious that according to the present invention one or either of the movable plates may be displaced in order to select the position of the aperture. According to one aspect of the present invention, the first movable plate is displaced by one step or column whenever one photograph is completed, and upon completion of the last photograph through the aperture formed by the last step of the first movable plate this plate is returned to its initial position and concurrently the second movable plate is displaced one step or row. This is accomplished according to the present invention by displacing the second plate by one step or row by its pawl for displacing the same actuated in response to the slight displacement of the first plate upon completion of said last photograph and simultaneously releasing the first movable plate so as to return it to its initial position. Upon completion of all of photographing operations, both of the movable plates are released to return to their initial positions.

The above and other objects, features and advantages of the present invention will become more apparent from the following description taken in conjunction with the accompanying drawings.

DESCRIPTION OF THE PREFERRED EMBODIMENT

Figure 1:
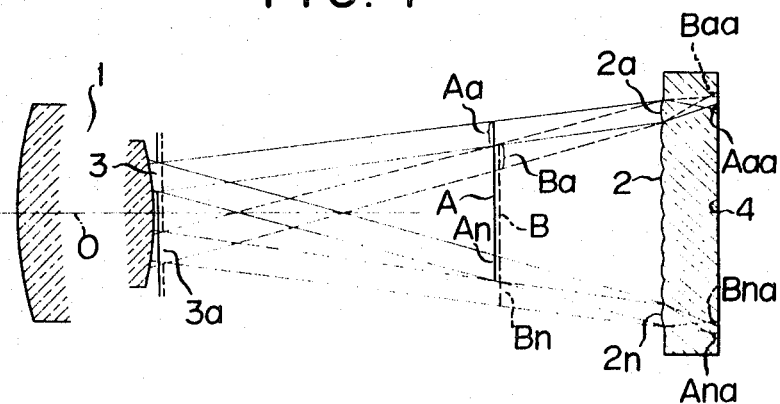
FIG. 1 is a perspective view of a compound photographic camera incorporating therein an aperture setting device according to the present invention.

As shown in FIG. 1, the optical system of a compound photographic camera consists of a first lens 1 having a relatively large diameter and being directed toward a subject to be photographed, a second lens 2 disposed backwardly of and spaced apart from the first lens 1 and a movable aperture 3 disposed immediately behind the first lens 1 and at a right angle relative to the optical axis O of the first lens 1. The second lens 2 is composed of a plurality of micro-lenses arranged in rows and columns into the form of a grid. The second lens 2 serves to split into finely split or divided images an inverted image formed by the first lens 1 and to focus these split images upon the surface of the light sensitized layer 4 disposed at the back of the second lens 2. The aperture 3 is vertically and horizontally movable within a plane perpendicular to the optical axis O of the first lens 1 and serves to permit each micro-lens element of the second lens 2 to focus a limited portion of the image formed through the first lens upon a predetermined area of the light sensitized layer 4. The same function of the aperture 3 may be accomplished even when it is disposed within the first lens 1.

Let it be assumed that an inverted image A of one subject is formed by the first lens 1 between the lenses 1 and 2. A small portion A$a$ of the image A included in the light ray through the aperture 3 and incident upon one micro-lens element 2$a$ is focused upon the light sensitized layer 4 as an erect split image A$aa$. Another small portion A$n$ of the image A included in the light ray through the aperture 3 and incident upon another micro-lens element 2$n$ is focused upon the sensitized layer 4 as an erect split image A$na$.

Next the aperture 3 is displaced to a position indicated by reference numeral 3$a$ and the first lens 1 is directed toward another subject to be photographed; an image B of this subject is formed. In the similar manner as described above, a small portion B$a$ of this image B included in the light ray through the aperture 3$a$ and incident upon the micro-lens element 2$a$ is focused upon the sensitized layer 4 as an erect split image B$aa$. The micro-lens element 2$n$ receives the light ray from the aperture 3$a$ including a small portion B$n$ of the image B and focuses this image upon the sensitized layer 4 as an erect split image B$na$.

When the aperture 3 is displaced to the position intermediate the positions 3 and 3$a$, the split images of the image obtained in this state are focused upon the areas intermediate the areas of the sensitized layer 4 exposed when the aperture was in the positions 3 and 3$a$ and the subjects were photographed. It will be obvious that when the aperture is displaced to a new position upon each photographing, this new position must not overlap with the former position at all.

A shutter mechanism for opening and closing the aperture held in a predetermined position upon photography may be disposed at a suitable position between the first and second lenses 1 and 2. The aperture which is displaced vertically or horizontally according to a predetermined arrangement is interlocked with the shutter mechanism in such a manner that the aperture is displaced to its new position in response to the shutter closing operation immediately after the shutter is released.

The split images of the image formed by the first lens 1 are distributed over the whole surface of the light sensitized layer 4 and the finely split images formed upon the layer 4 will not be superposed one upon another.

In the optical system including the movable aperture of the type described above, the number of pictures to be photographed is determined by the ratio of the exposure surface area when a sliding plate forming therein the apertures is removed, to that when said aperture is used. In other words, the number of pictures is determined by the ratio of the effective area of the first lens at one aperture position to the opening area of the aperture. For example, let it be assumed that the effective diameter of the first lens at one aperture position is 30 mm.; the focal length, 95 mm.; the distance between the aperture and an image formed through the first lens, 80 mm.; the distance from the aperture to the second lens, 40 mm.; the opening of the aperture, 1.2 mm. x 1.2 mm. and one step displacement pitch of the aperture in the horizontal and vertical directions, 3 mm. Then, the total of 25 pictures or scenes may be photographed upon one sensitized layer by displacing the aperture in five steps in both the horizontal and vertical directions.

As described above, the images of various subjects photographed by the compound photographic camera are distributed upon the surface of the light sensitized layer over the back surface of the second lens as finely split images so that it is impossible to detect the subjects. The images recorded upon the sensitized layer can be reproduced by projection upon a screen by means of light illumination originated from the back of the second lens to retrace the same optical system as used in the photographing.

In order to design the optical system compact in size, the first lens 2 may be disposed in front of a position of an image formed by the first lens 1, thereby splitting this image and focusing upon the light sensitized layer 4.

Figure 2:
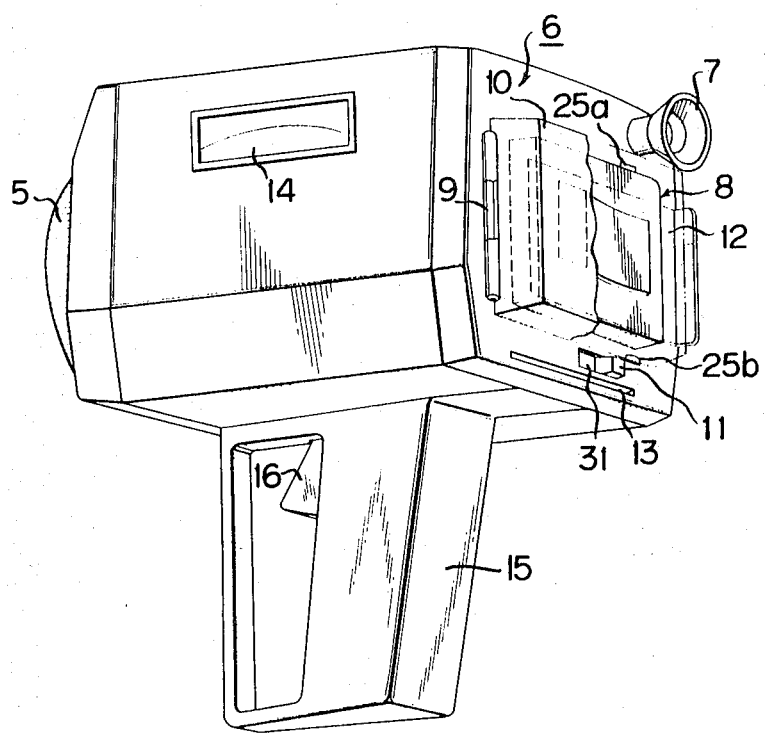
FIG. 2 is an illustration of one example of an optical system used in compound photography.

FIG. 2 shows one example of a compound photographic camera incorporating therein the optical system described with reference to FIG. 1. Upon the front panel of the box type camera body are arranged a lens barrel 5 having the first lens 1 supported therein, a viewfinder aperture, a light aperture for a photoelectric transducer element of an automatic exposure control device and so on. At the back panel 6 of the body are disposed a viewfinder 7 coupled optically to the viewfinder aperture, a second lens housing chamber 8 in which is disposed in light-tight arrangement the second lens 2 having a square configuration, a housing chamber locking cover 10 one side edge of which is hinged to the camera body by a hinge 9, an operating member 11 for releasing the locking of said locking cover 10 and a light shield plate inlet 13 through which is detachably inserted a shield plate 12 into the chamber 8.

An aperture for indicating the number of pictures photographed or film counter aperture is formed in one side wall of the camera body. On the other side of the camera body is disposed a battery storage for a miniature motor for not only charging the shutter but also driving the movable aperture whenever each photograph is made. At the bottom of the camera body is formed a grip 15 for ensuring the stationary holding of the camera and this grip 15 is provided with a trigger-like shutter releasing member 16.

Figure 3:
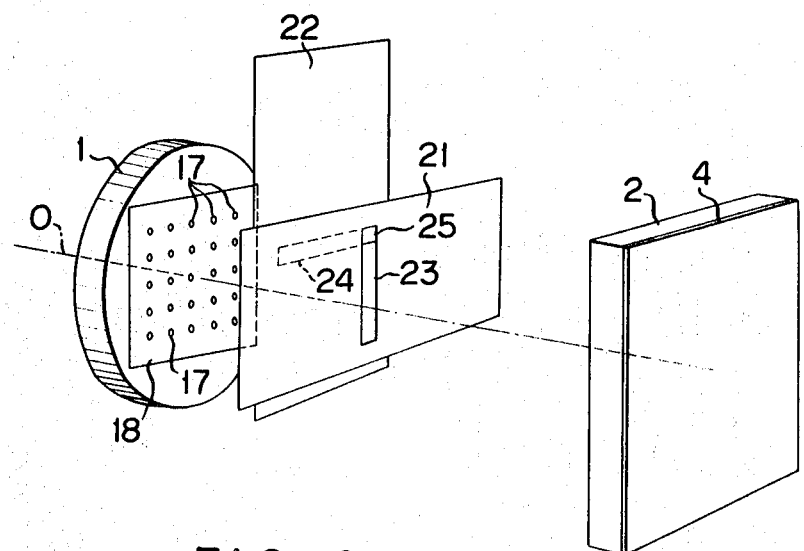
FIG. 3 is a schematic perspective view showing an aperture setting device.

FIG. 3 is a schematic view for explanation of the method of setting the aperture position. Backwardly of the lens 1 is disposed an aperture plate 18 having a plurality of relatively small apertures arranged in rows and columns in equidistantly spaced apart relation with each other in both directions. Backwardly of this aperture plate 18 are disposed first and second movable plates 21 and 22 in superposed relation with each other and in a closely spaced apart relation with the aperture plate 18. The first movable plate 21 has an elongated slot 23 formed vertically while the movable plate 22 has an elongated slot 24 formed horizontally, so that at the intersection of these slots 23 and 24 is formed one aperture or opening 25. The position of this aperture 25 may be displaced by displacing the slot 23 in the horizontal direction while displacing the slot 24 vertically. The movable plates 21 and 22 are so arranged that the position of the aperture 25 corresponds normally with one of the apertures 17 formed in the aperture plate 18.

The primary object of the present invention is to provide a device for setting the position of the aperture by accurately displacing both of the first and second movable plates.

Figure 4:
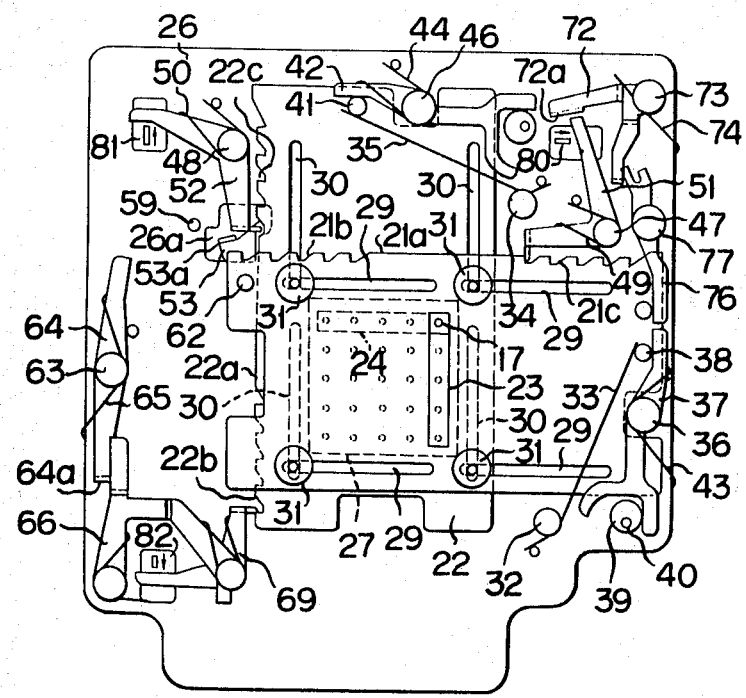
FIG. 4 is a rear view showing one embodiment of the present invention.

Referring to FIG. 4, a base plate 26 is fixed in position backwardly of the first lens and has an aperture plate having a plurality of apertures 17 fixed in position within a square aperture 27 corresponding to the first lens. Four shafts 31 each having a head and extending from the base plate 26 are loosely fitted into the slots 29 and 30 formed in the first and second movable plates 21 and 22 respectively so that both of the movable plates 21 and 22 are slidable relative to the base plate 26. The movable plates 21 and 22 are movable relative to each other at right angles with respect to each other. A spring 33 whose one end is fixed to a rivet 32 gives the first movable plate a tendency of moving toward the right in FIG. 4 while a spring 35 whose one end is fixed to a rivet 34 gives the second movable plate 22 a tendency of moving upwardly. The displacement of the first movable plate 21 is limited by the abutment of a pin 38 against a stopper 37 secured to a pivot 36 extending from the base plate 26. The rotation of the stopper 37 in turn is limited by an eccentric disk 39 carried by the base plate 26. When this eccentric disk 39 rotates about its shaft 40 so that the stopper 37 is rocked, the position at which the first movable plate 21 stops may be suitably adjusted. In the similar manner as described above, the second movable plate 22 is limited in its movement when a pin 41 engage with a stopper 42. Both of the stoppers 37 and 42 are imparted with the tendency of rotating in the counterclockwise direction about their shafts 36 and 46 respectively by means of springs 43 and 44 respectively so that the impact upon the abrupt engagement of the pins 38 and 41 by the operation to be described hereinafter will be reduced.

Alongside edges 21a and 22a of the movable plates 21 and 22 are formed respectively saw teeth 21b, 21c, 22d and 22c. One end each of engaging members 51 and 52, which are pivotably secured to pivots 47 and 48 extending from the base plate 26 and which are imparted with the tendency of rotating in the counterclockwise direction, is engaged with the saw teeth 21c and 22c, respectively. These engaging members 51 and 52 serve to prevent reverse motion of the movable plates 21 and 22 when they are displaced stepwise against the springs 33 and 35 toward the left and downward, respectively.

Figure 8:
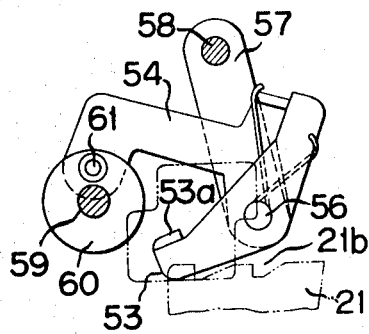
FIG. 8 is a rear view only showing the first movable plate displacing means.
Figure 9:
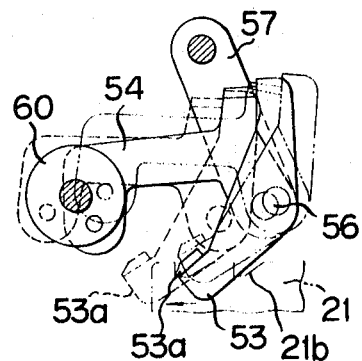
FIG. 9 is a rear view for explanation of the actuation thereof.

At a portion of the base plate 26 corresponding to the top left corner of the first movable plate 21 is formed an opening 26a through which extends an upright portion or protrusion 53a of a pawl 53 in engagement with the saw teeth 21b of the first movable plate 21. As shown in FIG. 8, one end each of the pawl 53 and a connecting member 54 is coaxially and pivotably secured to a pivot 56 extending from a rocking arm 57, which in turn is pivotably secured to a pivot 58 extending from the front surface of the base plate 26 (the back side or under surface of the paper in FIG 4). The other end of the connecting member 54 is pivotably secured to a pivot 61 which in turn is disposed upon and eccentrically of a disk 60 which is rotatably carried by a shaft 59 extending from the front surface of the base plate 26. This disk 60 is caused to make one rotation in the clockwise direction in FIG. 8 upon completion of actuation of the shutter so that the rocking arm 57 is caused to rock through the connecting arm 54, thereby engaging the upright portion 53a of the pawl 53 with the saw teeth 21b as shown in FIG. 9. In this case, while the pawl 53 is displaced to a position indicated by the dotted line 53a, the first movable plate 21 is displaced by one step toward the left. After the pawl 53 has displaced one step the first movable plate 21, the upright portion 53a is disengaged from the saw teeth 21b as best shown in FIGS. 4 and 8 and the reverse motion due to the force of the spring 53 of the first movable plate 21 is prevented by the engaging member 51 as described hereinabove.

Figure 5:
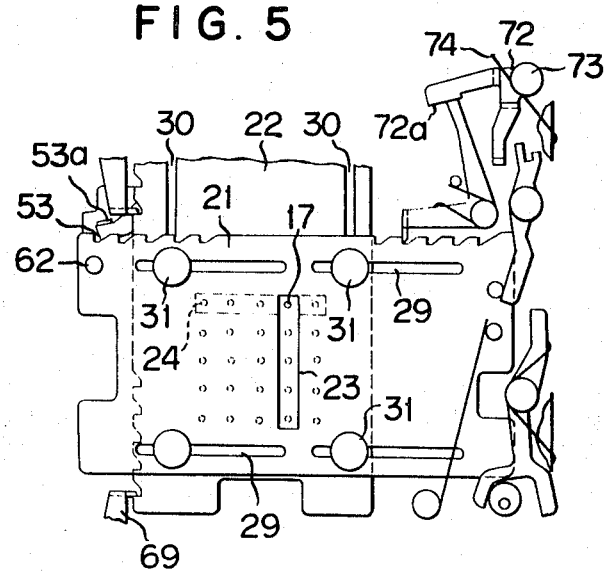
FIG. 5 is a similar view to FIG. 4 with an exception that a first movable plate is being shown as having been displaced one step or column toward the left.
Figure 6:
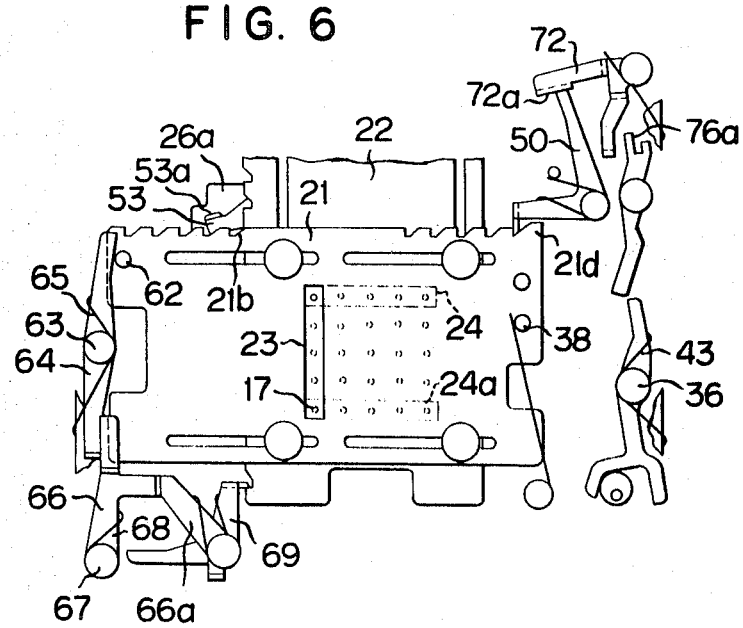
FIG. 6 is a similar view to FIG. 4, but the first movable plate is shown as having been displaced to the leftmost or end position.

FIG. 5 shows the state in which the disk 60 (see FIG. 8) has made one rotation after the first exposure and the first movable plate 21 is displaced by one step toward the left so that the second aperture is opened. FIG. 6 shows the state in which the elongated slot 23 of the first movable plate 21 is positioned at the leftmost position of the slot 24 after the fourth exposure so that the last aperture at the uppermost aperture group is opened.

Figure 7:
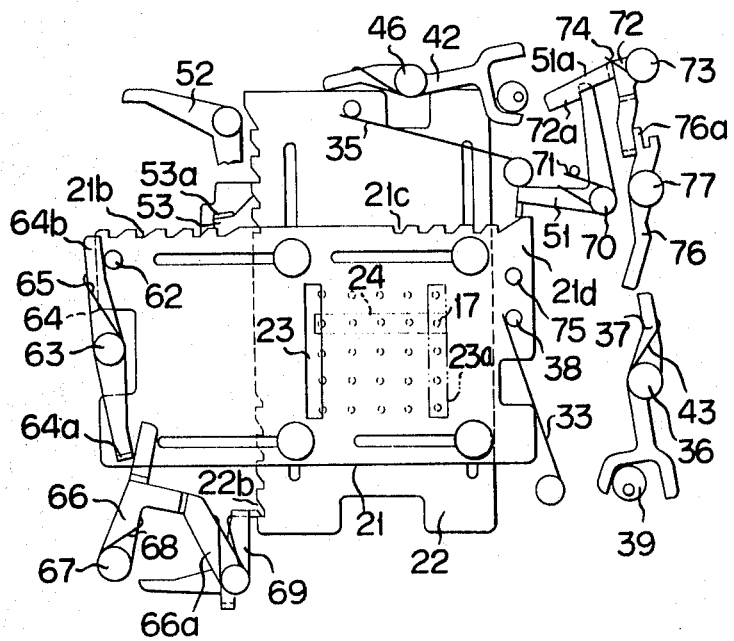
FIG. 7 is also similar to FIG. 4, but the second movable plate is shown as having been displaced by one step or row downwardly.

In the state shown in FIG. 6, the fifth exposure is made and then the upright portion 53a further advances the first movable plate 21 toward the left as shown in FIG. 7. When the first movable plate 21 is displaced to the left a pin 62 of the first movable plate 21 engages with one end 64b of a lever 64 pivotably secured to a pivot 63 extending from the base plate 26 so that the lever 64 is rotated in the counterclockwise direction against a spring 65. Therefore, the upright portion 64a formed at the other end of the lever 64 causes the rocking member 66 to rotate about its pivot 67 in the clockwise direction against a spring 68 so that the second movable plate 22 is moved down one step by a pawl 69 pivotably secured to the leading end of an arm 66a of the rocking member 66. When the second movable plate 22 is displaced by one step downwardly as described above, its reverse motion is prevented by the engaging member 52 as described above.

When the first movable plate 21 is displaced to its leftmost position as shown in FIG. 7, the leading end of the engaging member 51 rides over a protrusion 21d formed at the corner of the first movable plate 21 so that the engaging member 51 is caused to rotate about the pivot 70 in the clockwise direction against a spring 71. Therefore, the other end 51a of the engaging member 51 is disengaged from a bent or protrusion 72a of a stop member 72 so that the stop member 72 rotates through a small angle about its pivot 73 in the counterclockwise direction by a spring 74, thereby engaging with the engaging member 51. Consequently the engaging member 51 is prevented from engaging with the saw teeth 21c by the force of the spring 71. Thus, at the instant when the upright portion 53a of the pawl 53 is released from the saw teeth 21b, the first movable plate 21 is rapidly displaced toward the right by the force of the spring 33 and is stopped when the pin 38 engages with the stopper 37 so that the stopper 37 is caused to rotate against the spring 43 and to engage with the eccentric disk 39 as shown in FIG. 4. Since the spring 43 acts immediately before the first movable plate 21 is stopped, the shock or impact when the first movable plate 21 is stopped may be relieved. When the first plate 21 is returned to its initial position as described above, the pin 75 engages with a releasing or unlocking member 76 so that it is rotated about its pivot 77 in the counterclockwise direction, thereby rotating the stop member 72 against the spring 74 by the end 76a of the releasing or unlocking member 76. Consequently, the stop member 72 is released from the engaging member 51 so that the member 51 becomes free.

As shown in FIG. 7, when the slot 23 of the first movable plate 21 is returned to its initial position indicated by the chain line 23a while the second movable plate 22 is moved downwardly by one step, the aperture 17 at the right end of the second row is opened so that the sixth exposure is prepared.

As described above, whenever the first movable plate 21 makes one reciprocal motion, the second movable plate 22 is displaced downwardly one step or row. When the second movable plate 22 is displaced downwardly by five steps or rows, the slot 24 of the second plate 22 is positioned at the position indicated by the chain line 24' in FIG. 6 so that the aperture 17 for the last exposure is opened by the lower end portion of the slot 23 and the leftmost portion of the slot 24.

Upon completion of the last exposure (the 25th exposure), both of the engaging members 51 and 52, engaging the movable plates 21 and 22, respectively, and the pawl 69 for the second movable plate 22 are released so that both of the movable plates 21 and 22 are returned to their initial positions as shown in FIG. 4 by the springs 33 and 35 respectively.

The above described release of the engaging members 51 and 52 and the pawl 69 is effected by simultaneously rotating in the directions indicated by the arrows the elements 80, 81 and 82, which are interlocked with each other. This releasing operation may be effected from the exterior of the camera as needs demand. The pawl 69 for the second movable plate 22 may be so arranged that it engages with the saw teeth 22 only when displacing the movable plate 22 and remains released in other states.

According to the present invention, by the operation of displacing in one direction the first movable plate, this plate may be automatically returned to its initial position and concurrently the second movable plate may be advanced in a predetermined direction accurately.

The present invention has been described so far with particular reference with the preferred embodiment thereof, but it will be understood that variations and modifications can be effected without departing the true spirit of the present invention as described hereinabove and as a defined in the appended claims.

What is claimed is:

1. An aperture setting device for use in a compound photographic camera comprising
   first and second movable plates for slidable movement at right angles relative to each other.
   each of said movable plates having an elongated slot formed at a right angle relative to the direction of said slidable movement,
   means for advancing said second movable plate by one step relative to said first movable plate when the latter has been advanced to its end of movement, and
   means for returning said first movable plate to its initial position by actuating engaging means for said movable plate when the latter has been advanced to said end of movement,
   said elongated slots intersecting with each other thereby forming an opening for setting an aperture for photography.

2. An aperture setting device as defined in claim 1 wherein said engaging means for each of said movable plates comprises
   saw teeth formed along one side edge of each of said movable plates and an engaging member for engagement with said saw teeth, and
   each of said engaging members being adapted to be actuated from the exterior of a camera, thereby releasing said movable plates to return to their initial positions respectively.

References Cited

UNITED STATES PATENTS

| | | | |
|---|---|---|---|
| 1,782,860 | 11/1930 | Reipert | 95—36 X |
| 1,893,439 | 1/1933 | Ogden | 95—36 X |
| 3,387,547 | 6/1968 | Houghton | 95—18 P X |

SAMUEL S. MATTHEWS, Primary Examiner

K. C. HUTCHISON, Assistant Examiner

U.S. Cl. X.R.

355—53, 54, 86, 95, 96